United States Patent [19]

Sackmann et al.

[11] Patent Number: 5,258,466

[45] Date of Patent: Nov. 2, 1993

[54] PAPER SIZE

[75] Inventors: Günter Sackmann, Leverkusen; Joachim König, Odenthal; Fritz Puchner, Cologne; Heinz Bäumgen, Leverkusen, all of Fed. Rep. of Germany

[73] Assignee: Bayer Aktiengesellschaft, Leverkusen, Fed. Rep. of Germany

[21] Appl. No.: 713,923

[22] Filed: Jun. 12, 1991

[30] Foreign Application Priority Data

Jun. 21, 1990 [DE] Fed. Rep. of Germany ....... 4019798

[51] Int. Cl.$^5$ .................. C08F 2/24; C08F 20/10; C08F 22/06
[52] U.S. Cl. .................... 525/282; 525/203; 525/207; 525/213; 525/193; 525/194; 525/302; 525/309; 526/201; 526/203; 526/213; 526/219.5; 526/225; 162/164.5
[58] Field of Search ............... 525/282, 193, 282, 279, 525/191, 203, 242, 302

[56] References Cited

U.S. PATENT DOCUMENTS

| | | | |
|---|---|---|---|
| 3,720,733 | 3/1973 | Rinkler et al. | 525/203 |
| 4,151,336 | 4/1979 | Sackmann et al. | 525/242 |
| 4,317,893 | 3/1982 | Chen et al. | |
| 4,481,319 | 11/1984 | Sackmann et al. | 525/379 |
| 4,614,759 | 9/1986 | Sackmann et al. | 524/549 |
| 4,636,545 | 1/1987 | König et al. | 525/455 |
| 4,670,516 | 6/1987 | Sackmann et al. | 525/327.6 |
| 4,801,388 | 1/1989 | Fong et al. | 526/274 |
| 4,931,510 | 6/1990 | Sackmann et al. | 525/302 |
| 5,013,794 | 5/1991 | Sackmann et al. | 525/203 |

FOREIGN PATENT DOCUMENTS 1720679 7/1971 Fed. Rep. of Germany .

OTHER PUBLICATIONS

Chemical Abstracts, vol. 101, 1984, p. 15, paragraph No. 9166n, Columbus, Ohio, US: & JP-A-59 015 402 (Lion Corp.) Jan. 26, 1984.

*Primary Examiner*—James J. Seidleck
*Assistant Examiner*—M. L. Warzel
*Attorney, Agent, or Firm*—Sprung Horn Kramer & Woods

[57] ABSTRACT

Emulsion polymers which are prepared by free-radical polymerisation of monomers in the presence of
a) polymers of the formulae

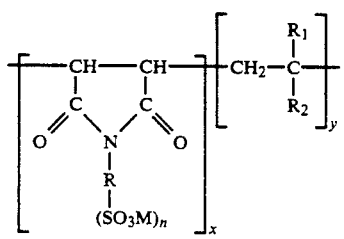

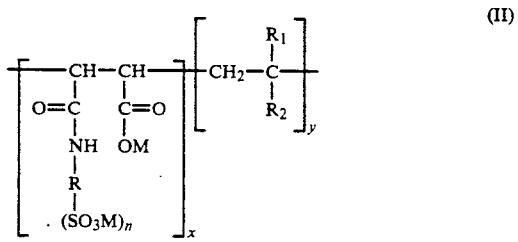

wherein the radicals have the meanings given in the description, and
b) low-molecular anionic emulsifiers, are outstandingly suitable as surface sizes for paper. They are distinguished by a low tendency to foaming and by a wide application spectrum.

16 Claims, No Drawings

PAPER SIZE

The invention relates to polymers and to their use, in particular for the surface sizing of paper or paper-like materials.

The production, which nowadays is the aim of the papermakers, in the neutral to weakly alkaline range leads to considerable advantages with respect to the raw materials, for example chalk as filler, and to the higher stability of the paper produced, caused by the elimination of aluminium sulphate, as compared with the acidic procedure hitherto carried out in most cases.

For an effective surface sizing of papers produced in the neutral range, sizes are therefore required which have a weakly anionic charge character and thus give an outstanding size effect on alum-free and chalk-containing papers. In addition, it would also be desirable that such sizes could also be used, when required, on papers produced in the acidic pH range with addition of aluminium sulphate, whereby the entire possible paper-making range would be covered.

It is thus the object of the present invention to provide sizes for paper, which have a wider application spectrum than the highly anionic products hitherto mainly used, and which can be used both in the acidic pH range in the case of alum-containing papers and in the neutral to weakly alkaline pH range in the case of alum-free and chalk-containing papers and which give an outstanding sizing effect coupled with a small tendency to foaming.

The invention thus relates to polymers which are obtainable by subjecting at least one monomer, capable of polymerisation by a free-radical mechanism, in the presence of a mixture of a polymer of the formulae (I) and/or (II)

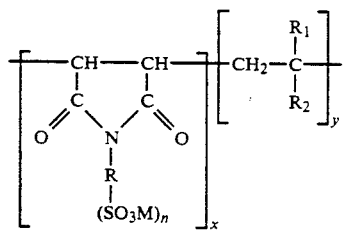
(I)

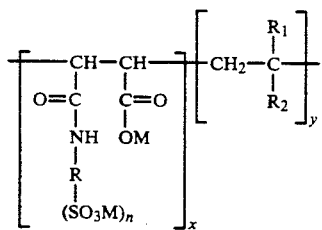
(II)

wherein

M designates a cation-forming radical, preferably H, Na, K, $NH_4$ or $R_3NH_3$, n designates 1 or 2, R designates an aliphatic radical having 1 to 10 C atoms or an aromatic radical having 6 to 10 C atoms, preferably a radical derived from a $C_1$-$C_4$-alkane or from benzene, methylbenzene or naphthalene, or $-(CH_2)_2NH(CH_2)_2-$, $R_1$ designates H or $-CH_3$, $R_2$ designates H, $C_1$-$C_{16}$-alkyl, preferably $-CH_3$, $-C_2H_5$, $-C_4H_9$, $-CH_2-C(CH_3)_3$, $-C_{14}H_{29}$ or $-C_{16}H_{33}$ and phenyl, $R_3$ designates a hydrocarbon radical of an amine and x and y are selected such that the weight-average molecular weight ($\overline{M}_w$) of the polymers (I) and (II) is 5000 to 500,000, preferably 10,000 to 100,000, and the ratio x:y is 1:4 to 1:1, preferably 1:3 to 1:1, and a low-molecular emulsifier carrying sulphonic acid groups, of the general formula (III)

$$\text{[benzene ring]}-(CH_2)_n-SO_3M \qquad (III)$$

where
n = 10–14 and
M = H, Na, K, $NH_4$ or $R_3NH_3$,
to a free-radical emulsion polymerisation.

The polymers of the formulae (I) and/or (II) can be mixtures in which preferably $\geq 80$ and particularly preferably $\geq 90\%$ by weight, relative to the mixture, of structural units (I) are present.

The mixing ratio between polymeric emulsifier (formulae (I) and (II)) and low-molecular emulsifier (formula (III)) is between 20:1 and 1:1, preferably between 15:1 and 3:2 and particularly preferably between 10:1 and 5:2.

The total quantity of emulsifier mixture used, consisting of polymeric and low-molecular emulsifier, is 2.5 to 30% by weight, preferably 7.5 to 20% by weight, relative to the monomers to be polymerised.

Suitable monomers, which are capable of polymerisation by a free-radical mechanism, are especially styrene (derivatives), (meth)acrylates and/or (meth)acrylonitrile and also mixtures of these monomers. The following may be mentioned by way of example: styrene, α-methylstyrene, acrylonitrile, vinyl acetate, ethyl acrylate, methyl methacrylate, n-butyl acrylate, i-butylacrylate, 2-ethylhexyl acrylate and hydroxypropyl methacrylate. With particular preference, n-butyl acrylate, styrene and acrylonitrile are used. With very particular preference, the mixture is used which contains 20 to 80 and especially 30 to 70% by weight of n-butyl acrylate and 80 to 20 and especially 70 to 30% by weight of acrylonitrile.

The free-radical emulsion polymerisation of the monomers in the presence of the emulsifier mixture of the polymers (I) and/or (II) and the low-molecular emulsifier which corresponds to the formula (III) and can act as an emulsifier and grafting substrate, is carried out in the usual manner. For example, the procedure followed here can be as described below:

A copolymerisation, initiated by free radicals, of the monomers (monomer mixtures) is carried out in the presence of aqueous solutions of the emulsifier mixture. Examples of suitable free-radical starters are potassium persulphate, ammonium persulphate, organic peroxides, organic hydroperoxides, hydrogen peroxide and redox systems. The emulsion polymerisations take place at temperatures between 20° C. and 100° C., preferably 40° C. and 80° C.

The emulsion polymerisation procedure can be carried out either in such a way that an aqueous solution of the emulsifier mixture is introduced first and the monomers and the initiator are then metered in separately over a defined period, for example of between 2 and 6 hours, or else a part of the emulsifier mixture is first introduced in water and the remainder is metered in together with the monomers and the initiator in separate mass flows, likewise over a period of 2 to 6 hours. It is, however, also possible to proceed in such a way that emulsifier mixture, initiator and monomers are metered in separately and continuously over the entire period of the polymerisation, and only a defined quantity of water is introduced first. This type of polymerisation is, however, also suitable for carrying out a batch procedure, that is to say emulsifier mixture, monomer (mixture) and initiator, are first introduced together, heated to the desired polymerisation temperature and held at this temperature for between 2 and 10 hours.

After the end of the polymerisation reaction in the way described by way of example, a finely dispersed aqueous polymer emulsion having a mean particle diameter of between 40 and 400 nm has formed. In addition to homopolymers and/or copolymers of the monomers or monomer mixtures used for the polymerisation, the emulsion also contains fractions of graft products of the monomers, which have been grafted on to the polymeric emulsifiers.

If desired, the aqueous polymer emulsions can be worked up in the usual manner to recover the solid polymers.

The polymers according to the invention can be used, for example, as film-forming materials or as sizes for fibres, in particular glass fibres. Preferably, however, they are used in the form of aqueous emulsions (as may arise during their preparation) for the surface sizing of paper or paper-like materials such as cardboard or paperboard.

These are surface sizes for paper having a weakly anionic charge character and an extremely low tendency to foaming as well as a very wide application spectrum. They can be used in papermaking both in the acidic and in the neutral pH region. They give an excellent sizing effect in alum-containing, alum-free, presized and ligneous papers which contain various fillers such as kaolin, chalk or $TiO_2$.

It is of decisive importance for the quality of the sizing effect of the sizes according to the invention that, in the preparation of the emulsion polymers, the mixture of polymeric and low-molecular emulsifier is introduced before the polymerisation of the monomers or, if the polymerisation is carried out as a batch with continuous feed, simultaneously with the monomer mixture.

If the procedure is such that the polymerisation is first carried out solely in the presence of the polymeric emulsifier and the low-molecular emulsifier is admixed after the reaction has ended, products are obtained which have substantially poorer application properties with respect to both the sizing effect and the foaming behaviour.

The surface sizes can be used in accordance with all the processing methods usual for surface sizing in papermaking, such as introduction in the size press or application by spraying methods. The sizes can be applied either alone or in combination with aqueous solutions of polymers. They are insensitive to foam-promoting influences, for example unfavourable equipment conditions on the paper machine or size press, foam-forming additives in the size liquor and high degrees of hardness of the water used in papermaking. In addition to their good sizing effect, their low tendency to foaming represents a further advantage, since they can be used without an addition of antifoams. The sizes are suitable either alone or in combination with sizes, which are added to the pulp, for the surface sizing of almost all paper grades produced in practice, for example of alum-containing, alum-free, kaolin-filled, chalk-filled, $TiO_2$-filled unsized, presized, ligneous and wastepaper-containing papers produced in the neutral and acidic pH range.

The new sizes are distinguished in particular by the fact that they have a substantially wider application spectrum as compared with sizes of high anionic character. Whereas the latter show a good sizing effect only on alum-containing, presized and ligneous papers, the products according to the invention show, in addition to the papers mentioned, outstanding sizing properties also on alum-free and chalk-containing papers. To obtain good sizing on the two last-mentioned papers, it has hitherto always been necessary to use surface sizes having a cationic charge.

Some of the polymers (I) and (II) are known (see, for example, German Offenlegungsschrift 3,344,470). They can be prepared according to or analogously to known processes. For example, the procedure can be as follows: copolymers of maleic anhydride or maleic acid (half) esters and olefins of the formula

in which $R_1$ and $R_2$ have the meanings given under the formulae (I) and (II), are reacted with aminosulphonic acids or salts thereof, of the formula

in which

R, M and n have the meanings given under the formulae (I) and (II), in organic solvents or preferably in aqueous solution at temperatures of up to 250° C., preferably 100° to 250° C., particularly preferably 120° to 200° C., and for reaction times from 5 to 20 hours, preferably 10 to 15 hours.

The copolymers used can be copolymers of alternating or random structure consisting of maleic anhydride and, for example, ethylene, styrene, α-methylstyrene, propylene, isobutylene, 1-butene, diisobutylene, 1-dodecene, 1-hexadecene and 1-octadecene, the molar ratio between maleic anhydride and the monomers to be copolymerized being between 1:1 and 1:4, preferably between 1:1 and 1:3. The preparation of such copolymers is known and described, for example, in Houben-Weyl, Methoden der organischen Chemie, [Methods of Organic Chemistry], Volume E XIV, Part 2, Georg Thieme Verlag, Stuttgart 1987.

The following may be mentioned by way of example as aminosulphonic acids of the formula (V): 2-aminoethanesulphonic acid, N-aminoethyl-2-aminoethanesulphonic acid ($H_2NCH_2CH_2NHCH_2CH_2SO_3H$), 2-aminobenzenesulphonic acid, 3-aminobenzenesulphonic acid, 4-aminobenzenesulphonic acid, aminonaphthalenesulphonic acid, 4-amino-1,3-benzenedisulphonic acid, 5-amino-1,3-benzenedisulphonic acid, and 2-amino-1,4-benzenedisulphonic acid.

EXAMPLES

The percentage data in the examples which follow always relate to the weight.

1) Preparation of the polymeric emulsifier X:

The following reaction mixture:
3,026 g of deionised water,
546 g of a maleic anhdyride/diisobutylene copolymer of alternating structure ($\overline{M}_w \approx 11,000$) and
813 g of a 46% strength by weight aqueous solution of Na 2-aminoethanesulphonate
are introduced first into a 6 l steel autoclave fitted with a blade stirrer, while blanketing with nitrogen.

After the reactor has been sealed, the mixture is heated to 100° C. and stirred for 10 hours at this temperature. The temperature is then raised to 140° C. and stirring is continued for a further 10 hours. During this time, the pressure rises to about 5 bars. The mixture is then cooled to room temperature and the polymeric solution formed is filled into containers.

Solids content: 18.9%; pH value: 8.8.

2) Preparation of the polymeric emulsifier Y:

The preparation of the polymeric emulsifier Y is carried out as described under 1), using the following reaction mixture: 525 g of a maleic anhydride/diisobutylene copolymer of alternating structure ($\overline{M}_w \approx 11,000$), 913.5 g of a 52% strength by weight aqueous solution of Na N-aminoethyl-2-aminoethanesulphonate and 3,337 g of deionised water. At the end of the reaction, an aqueous solution of the polymeric emulsifier Y, having a solids content of 19.2% by weight, is obtained.

3) Preparation of the polymeric emulsifier Z:

The procedure followed is as described under 1) and 2), but using the following reaction mixture: 350 g of a copolymer of maleic anhydride and 1-octadecene of alternating structure ($\overline{M}_w \approx 10,000$), 588 g of a 25% strength by weight aqueous solution of Na taurinate and 1,457 g of deionised water.

After the end of the reaction, an aqueous solution of the polymeric emulsifier Z, having a solids content of 20.5% by weight and a pH value of 8.5, is obtained.

Preparation of the size dispersion A 100.5 g of an 18.9% strength by weight aqueous solution of polymeric emulsifier X as well as 5.0 g of a 20% strength by weight aqueous solution of the ammonium salt of the low-molecular emulsifier of the general formula (III) and 540 mg of Rongalit C in 435 g of electrolyte-free water are first introduced into a three-necked flask fitted with stirrer, reflux condenser and two dropping funnels, with stirring and blanketing with nitrogen, and heated to a temperature of 50° C. One quarter of each of solutions 1) and 2) is then added rapidly and the mixture is stirred for 1 hour at 50° C. Subsequently, the remaining solutions 1) and 2) are metered in separately but simultaneously in the course of 3 hours.

| Solution 1): | 1.60 g of ammonium persulphate |
| --- | --- |
|  | 140 g of deionised water |
| Solution 2): | 100 g of acrylonitrile |
|  | 100 g of n-butyl acrylate |

After the end of metering, stirring is continued for a further 6 hours at 50° C. The resulting fine dispersion is subjected to a degassing procedure in vacuo, to remove residual monomers.

| Solids content of the dispersion: | 26.4% |
| --- | --- |
| Mean particle size: | 66 nm |

Preparation of size dispersion B

The procedure for preparing size dispersion B is similar to that for the preparation of size A, but with the initial quantities altered as follows: 63.5 g of the 18.9% strength by weight aqueous solution of the polymeric emulsifier X, 40 g of a 20% strength by weight aqueous solution of the low-molecular emulsifier of the general formula (III), 540 mg of Rongalit C and 436.5 g of deionised water. The remaining experimental procedure is the same as in the preparation of size A. At the end of the polymerisation, a fine size dispersion having a solids content of 26.1% and a mean particle size of 47 nm determined by LCS (LCS=laser correlation spectroscopy) is obtained.

Preparation of size dispersions C and D

The preparation of these two products is carried out in the same way as already described for sizes A and B, but with the initial quantities altered as follows:

| Size C: | 84.7 g | of polymeric emulsifier X (18.9% strength aqueous solution) |
| --- | --- | --- |
|  | 20 g | of low-molecular emulsifier (20% strength aqueous solution) |
|  | 540 mg | of Rongalit C |
|  | 655 g | of deionised water |

After the end of the reaction, a fine dispersion of size C having a solids content of 22.8% and a mean particle size of 59 nm is obtained.

| Size D: | 63.5 g | of polymeric emulsifier X (18.9% strength aqueous solution) |
| --- | --- | --- |
|  | 40 g | of low-molecular emulsifier (20% strength aqueous solution) |
|  | 540 mg | of Rongalit C |
|  | 657 g | of deionised water |

A size dispersion D having a solids content of 20.9% and a mean particle size of 50 nm has formed.

Preparation of size dispersion E 156 g of polymeric emulsifier Y (solids content: 19.2% in water), 540 mg of Rongalit C and 523.2 g of deionised water are first introduced into a three-necked flask with stirring and blanketing with nitrogen and heated to a temperature of 50° C. One quarter of each of solutions 1) and 2) is then added all at once, and the mixture is stirred for one hour at 50° C.:

| Solution 1): | 1.60 g of ammonium persulphate |
| --- | --- |
|  | 140 g of water |
| Solution 2): | 100 g of acrylonitrile |
|  | 100 g of n-butyl acrylate |

The remaining parts of solutions 1) and 2) are added dropwise simultaneously but separately in the course of 3 hours. After the end of the addition, stirring is continued for a further 6 hours at 50° C. and the fine size dispersion then formed is subjected to a degassing process in vacuo.

| Solids content: | 22.9% |
|---|---|
| Mean particle size: | 69 nm |

Preparation of size dispersion F

The size dispersion F is prepared in the same way as the size dispersion E, but using polymeric emulsifier Z.

| Initial quantities: | 195 g | of polymeric emulsifier Z (solids content: 20.5% in water) |
|---|---|---|
| | 540 mg | of Rongalit C |
| | 532 g | of deionised water |

The remainder of the experiment is carried out by a procedure identical to that described for the preparation of size dispersion E.

| Solids content: | 23.6% |
|---|---|
| Mean particle size: | 86 nm |

APPLICATION EXAMPLES

The sizing effect of the sizes according to the invention was tested on both alum-free and alum-containing paper and in one case (application Example 4) also on presized paper. The alum-free paper here had the following composition:
50% of softwood cellulose, 50% of hardwood cellulose, 9.5% of clay ash, pH value in the headbox: 7.2; degree of fineness: 35° SR; water absorption in a laboratory size press: about 85%; paper weight: 80 g/m².

The alum-containing paper had the following composition:
50% of softwood cellulose, 50% of hardwood cellulose, 1% of alum, 11.2% of clay ash, pH value in the headbox: 5.0; degree of fineness: 35° SR; water absorption: about 80%; paper weight: 80 g/m².

The presized paper had the following composition:
50% of softwood cellulose, 50% of hardwood cellulose, 1% of Al sulphate, 11.1% of clay ash, 0.1% of resin size, pH value in the headbox: 4.5; water absorption: about 70%; paper weight: 80 g/m².

The sizing of the papers was carried out in a laboratory size press made by Messrs. Mathis, Zurich, Switzerland, Type HF. The size liquor used was a solution of 5 parts by weight of commercially available starch and 0.128, 0.16 and 0.20 part—calculated as active substance—of the size to be tested, which solution was made up with water to 100 parts. The surface-sized papers were dried on a drying cylinder within one minute at about 100° C. Before the sizing test, the papers were conditioned for 2 hours at room temperature.

To assess the sizing degree of the surface-sized papers, the Cobb values (according to DIN 53 132) were determined and ink flotation tests (IFT) were carried out. For the ink flotation tests, the papers were cut into strips of 3 cm width and 3 cm length and placed upon blue testing ink (DIN 53 126) at 22° C. After differing test times for the individual paper types, the sample papers were removed from the ink, squeezed off on the back on blotting paper and visually evaluated after 5 minutes. For a qualitative determination of the ink penetration through the paper and hence of the sizing degree, a rating by the numbers 1 to 5 was carried out, the individual numbers meaning:

| 1 | no ink penetration |
|---|---|
| 2 | 5 to 10% ink penetration |
| 3 | 10 to 20% ink penetration |
| 4 | about 50% ink penetration |
| 4.5*) | about 90% ink penetration |
| 5 | 100% ink penetration |

*)Moreover, yet further intermediate values can be used.

Tables 1 to 8 which follow show the effectiveness of the paper surface sizes A-F according to the invention on alum-free and alum-containing paper.

APPLICATION EXAMPLE 1

The Cobb values measured with the sizes A and B are reproduced in Table 1, and the results found in the ink flotation tests (IFT) are introduced in Table 2:

TABLE 1

| | Size A Cobb value (60″) in g/m² with addition of | | Size B Cobb value (60″) in g/m² with addition of | |
|---|---|---|---|---|
| Paper type | 0.16% | 0.20% | 0.16% | 0.20% |
| Alum-free | 27.0 | 25.3 | 28.2 | 25.3 |
| Alum-containing | 22.5 | 21.3 | 22.8 | 22.2 |

TABLE 2

| | | Size A IFT with addition of | | Size B IFT with addition of | |
|---|---|---|---|---|---|
| Paper type | Time | 0.16% | 0.20% | 0.16% | 0.20% |
| Alum-free | 14′ | 2.5 | 2 | 2.5 | 2 |
| Alum-containing | 10′ | 2.5 | 1.5 | 2 | 1.5 |

APPLICATION EXAMPLE 2

The Cobb values measured with the sizes C and D are shown in Table 3 and the results found in the ink flotation tests (IFT) are shown in Table 4:

TABLE 3

| | Size C Cobb value (60″) in g/m² with addition of | | Size D Cobb value (60″) in g/m² with addition of | |
|---|---|---|---|---|
| Paper type | 0.16% | 0.20% | 0.16% | 0.20% |
| Alum-free | 27.9 | 25.7 | 26.8 | 25.3 |
| Alum-containing | 23.9 | 22.4 | 23.7 | 22.7 |

TABLE 4

| | | Size C IFT with addition of | | Size D IFT with addition of | |
|---|---|---|---|---|---|
| Paper type | Time | 0.16% | 0.20% | 0.16% | 0.20% |
| Alum-free | 8′ | 3 | 2 | 3 | 2 |
| Alum-containing | 12′ | 3 | 2 | 2.5 | 2 |

APPLICATION EXAMPLE 3

Tables 5 and 6 show the application test results found for size E, likewise on the two paper types "alum-free" and "alum-containing":

TABLE 5

| Paper type | Cobb value (60") in g/m² with addition of | |
|---|---|---|
| | 0.16% | 0.20% |
| Alum-free | 27.5 | 26.2 |
| Alum-containing | 27.0 | 24.0 |

TABLE 6

| Paper type | Time | IFT with addition of | |
|---|---|---|---|
| | | 0.16% | 0.20% |
| Alum-free | 11' | 2 | 1.5 |
| Alum-containing | 11' | 2 | 1.5 |

APPLICATION EXAMPLE 4

The test results obtained with size F on alum-free, alum-containing and presized paper are summarized in Tables 7 and 8:

TABLE 7

| Paper type | Cobb value (60") in g/m² with addition of | | |
|---|---|---|---|
| | 0.128% | 0.16% | 0.20% |
| Alum-free | 35.2 | 30.0 | 26.2 |
| Alum-containing | 28.5 | 23.0 | 22.1 |
| Presized | 23.5 | 22.1 | 21.8 |

TABLE 8

| Paper type | Time | IFT with addition of | | |
|---|---|---|---|---|
| | | 0.128% | 0.16% | 0.20% |
| Alum-free | 10' | 3 | 2.5 | 2 |
| Alum-containing | 8' | 3 | 2 | 1.5 |
| Presized | 8' | 2.5 | 2 | 1.5 |

As can be shown by application Examples 1 to 4, the sizes according to the invention show excellent sizing behaviour on papers of different composition.

APPLICATION EXAMPLE 5

The foaming behaviour of sizes A-F is examined by means of this example:

0.4% by weight of active substance of the size dispersions to be tested are dissolved in a sizing liquor of 5% by weight of commercially available starch (Perfectamyl A 4692 ®) and heated to 60° C. 200 ml of this sizing liquor are passed from a metal vessel, which has a circular orifice of 4 mm diameter on its underside, from a height of 60 cm in free fall into a graduated beaker. The volume, in ml, of the foam forming above the liquid surface is determined once immediately and after standing in air for 1 minute. The first measured value here provides information on the foaming tendency of the sizes, and the second measured value provides information on the rate of foam degradation and/or on the stability of the foam. The test results obtained with the size dispersions are summarised in Table 9:

TABLE 9

| Size | Foam volume in ml | |
|---|---|---|
| | immediately | after 1 minute |
| A | 90 | 20 |
| B | 110 | 30 |
| C | 120 | 30 |
| D | 100 | 20 |
| E | 110 | 80 |

TABLE 9-continued

| Size | Foam volume in ml | |
|---|---|---|
| | immediately | after 1 minute |
| F | 0 | 0 |

The results found show clearly that the tested products have only a relatively low tendency to foaming and that the foam formed is as a rule very rapidly degraded again. The size F can even be described as absolutely foam-free.

We claim:

1. Polymers obtained by free-radical emulsion polymerization of at least one monomer, capable of polymerization by a free-radical mechanism, in the presence of a mixture of a) a polymer of the formulae (I) and/or (II)

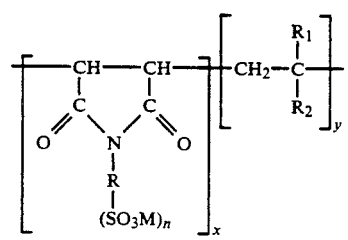

(I)

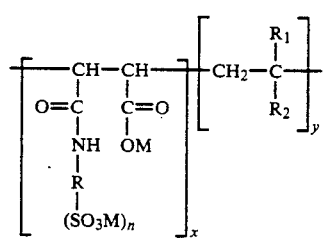

(II)

wherein

M designates a cation-forming radical n designates 1 or 2,

R designates an aliphatic radical having 1 to 10 C atoms or an aromatic radical having 6 to 10 C atoms, or —(CH₂)₂NH(CH₂)₂—, $R_1$ designates H or —CH₃, $R_2$ designates H, $C_1$-$C_{16}$-alkyl, or phenyl, $R_3$ designates the hydrocarbon radical of an amine and x and y are selected such that the weight-average molecular weight ($\overline{M}_w$) of the polymers (I) and (II) is 5000 to 500,000, and the ratio x:y is 1:4 to 1:1, and b) a low-molecular emulsifier carrying sulphonic acid groups of the formula (III)

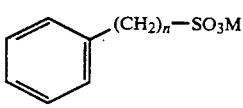

(III)

where n = 10–14 and

M = H, Na, K, NH₄ or R₃NH₃ characterized in that the polymeric/low molecular emulsifier weight ratio is between 20:1 and 1:1.

2. Polymers according to claim 1, characterised in that a polymer of the formulae (I) and/or (II) is used, wherein R represents —CH$_2$—CH$_2$—.

3. Polymers according to claim 1, characterised in that a polymer of the formulae (I) and/or (II) is used, wherein R represents —CH$_2$CH$_2$—NH—CH$_2$—CH$_2$—.

4. Polymers according to claim 1, characterized in that a mixture of the polymers (I) and (II) is used, in which ≧80% by weight, relative to the mixture, of structural units (I) are present.

5. Polymers according to claim 1, characterised in that styrene (derivatives), (meth)acrylates and/or (meth)acrylonitrile are used as the monomers polymerisable by a free-radical mechanism.

6. Polymers according to claim 1, characterised in that at least one monomer, polymerisable by a free-radical mechanism, selected from the group consisting of styrene, α-methylstyrene, acrylonitrile, vinyl, acetate, ethyl acrylate, methyl acrylate, n-butyl acrylate, 2-ethylhexyl acrylate, methyl methacrylate and hydroxypropyl methacrylate is used.

7. Polymers according to claim 1, characterised in that a monomer mixture of 20 to 80% by weight, of n-butyl acrylate and 80 to 20% by weight of acrylonitrile is used.

8. Polymers according to claim 1, characterised in that the polymeric/low-molecular emulsifier weight ratio is between 10:1 and 3:2.

9. Polymers according to claim 1 where the monomer is styrene.

10. Polymers according to claim 1 where the monomer is α-methylstyrene.

11. Polymers according to claim 1 where the monomer is acrylonitrile.

12. Polymers according to claim 1 where the monomer is vinyl acetate.

13. Polymers according to claim 1 where the monomer is selected from the group consisting of ethyl acrylate, methyl acrylate, and 2-ethylhexyl acrylate.

14. Polymers according to claim 1 where the monomer is methyl methacrylate.

15. Polymers according to claim 1 where the monomer is hydroxypropyl methacrylate.

16. In the sizing of paper or paper-like material wherein a sizing composition is applied to said paper or paper-like material, the improvement which comprises using as said sizing composition a sizing composition comprising a polymer of claim 1.

* * * * *